(12) United States Patent
Poulakis

(10) Patent No.: US 6,986,822 B1
(45) Date of Patent: Jan. 17, 2006

(54) METHOD FOR PRODUCING A FOAM ELEMENT, ESPECIALLY A FOAM PADDING ELEMENT FOR A PLANE OR VEHICLE SEAT

(75) Inventor: Konstantinos Poulakis, Pulsnitz (DE)

(73) Assignee: Gottlieb Binder GmbH & Co., Holzgerlingen (DE)

( * ) Notice: Subject to any disclaimer, the term of this patent is extended or adjusted under 35 U.S.C. 154(b) by 0 days.

(21) Appl. No.: 09/786,328

(22) PCT Filed: Jul. 24, 1999

(86) PCT No.: PCT/EP99/05303

§ 371 (c)(1),
(2), (4) Date: Mar. 2, 2001

(87) PCT Pub. No.: WO00/41865

PCT Pub. Date: Jul. 20, 2000

(30) Foreign Application Priority Data

Jan. 11, 1999 (DE) ................................. 199 00 623

(51) Int. Cl.
*B29C 47/00* (2006.01)
(52) U.S. Cl. ....................... 156/245; 264/275; 428/120; 428/900
(58) Field of Classification Search ................ 156/78, 156/272.4, 238, 245; 428/120, 100, 128; 264/134, 274, 275, 278; 427/128
See application file for complete search history.

(56) References Cited

U.S. PATENT DOCUMENTS

| | | | |
|---|---|---|---|
| 2,909,442 A | * | 10/1959 | Persoon ...................... 428/347 |
| 3,497,411 A | * | 2/1970 | Chebiniak ................... 101/369 |
| 3,759,644 A | * | 9/1973 | Ladney, Jr. .................... 249/6 |
| 4,273,603 A | * | 6/1981 | Peronnet et al. ............ 156/236 |
| 4,563,380 A | * | 1/1986 | Black et al. .................. 24/306 |
| 4,784,890 A | * | 11/1988 | Black .......................... 24/306 |
| 4,931,344 A | * | 6/1990 | Ogawa et al. ................ 24/444 |
| 4,941,236 A | * | 7/1990 | Sherman et al. ....... 24/265 WS |
| 5,286,431 A | * | 2/1994 | Banfield et al. ............ 264/134 |
| 5,725,928 A | * | 3/1998 | Kenney et al. .............. 24/451 |

FOREIGN PATENT DOCUMENTS

| | | | |
|---|---|---|---|
| DE | 3540648 A | * | 5/1987 |
| EP | 457226 A1 | * | 11/1991 |
| JP | 01152017 A | * | 6/1989 |
| JP | 03086102 A | * | 4/1991 |

OTHER PUBLICATIONS

English abstract of EP 457226.*
English abstract of JP 03086102.*
English abstract for JP 01152017.*

* cited by examiner

*Primary Examiner*—Jeff H. Aftergut
*Assistant Examiner*—John L. Goff
(74) *Attorney, Agent, or Firm*—Roylance, Abrams, Berdo & Goodman, L.L.P.

(57) ABSTRACT

In a method for producing a foam element, especially a foam padding element for a plane or vehicle seat, a layer is applied to at least one shaping wall section of a foaming mold. The layer is of a material that forms a barrier layer between the foam material and the respective wall section during the foaming process. A fleece with a ferromagnetic coating is used as the layer forming the barrier layer. The fleece is releasably held in its position at the wall section by a device that produces a ferromagnetic field and interacts with the ferromagnetic coating.

23 Claims, 2 Drawing Sheets

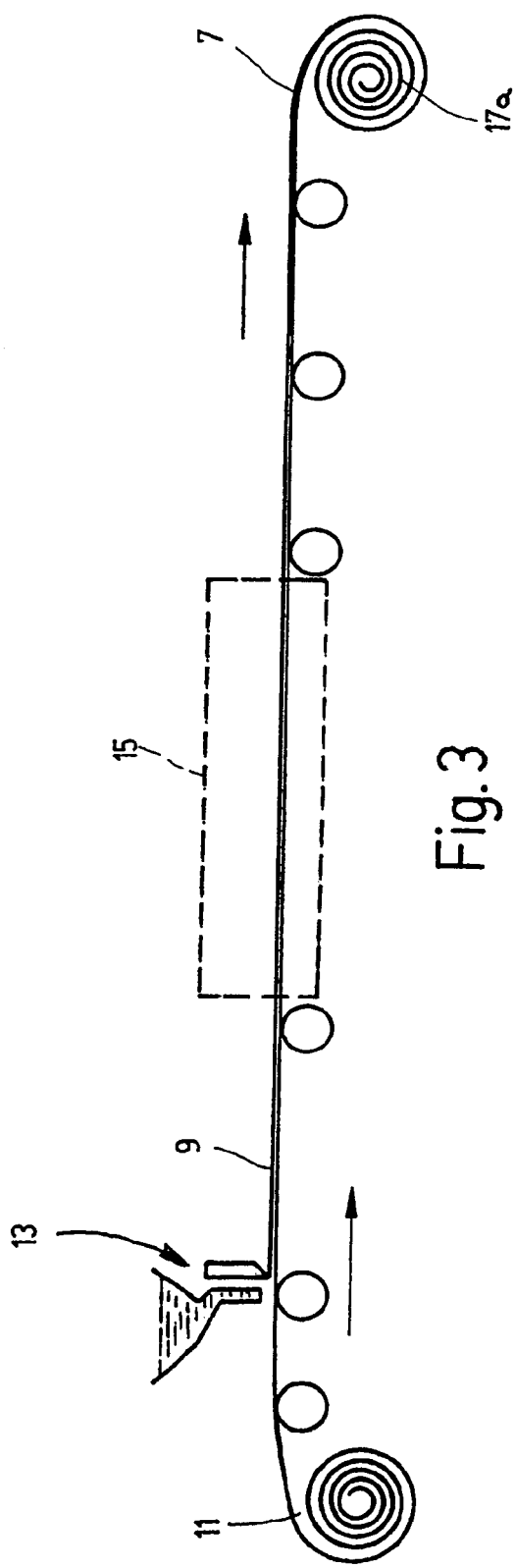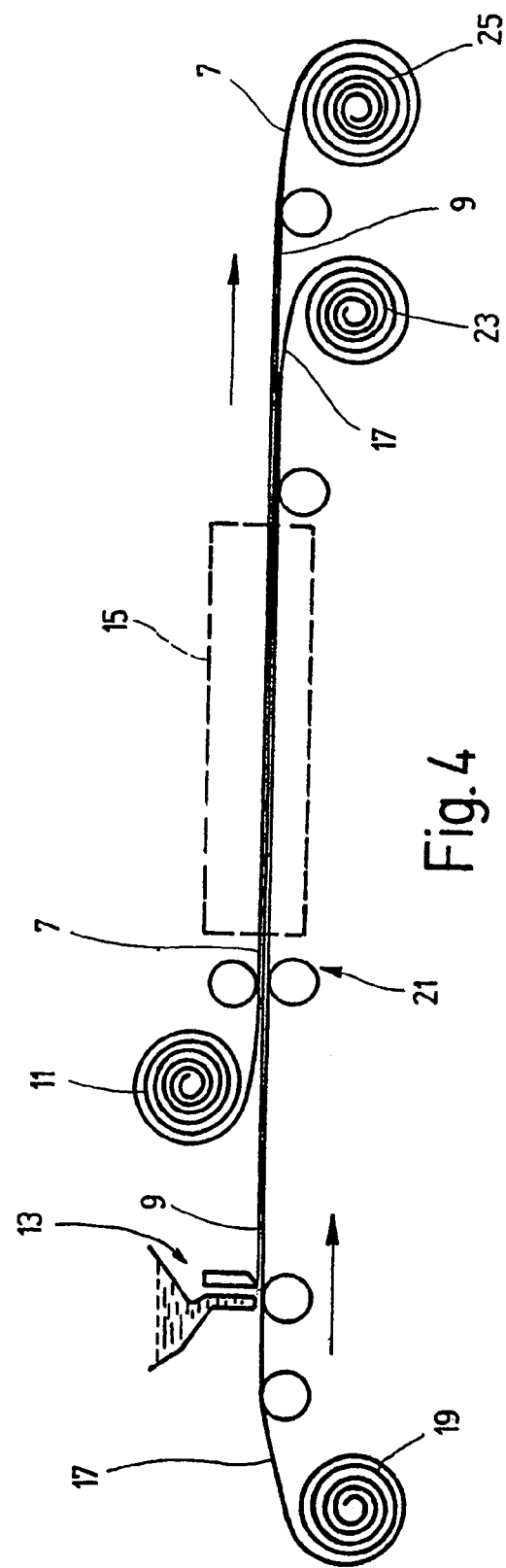

METHOD FOR PRODUCING A FOAM ELEMENT, ESPECIALLY A FOAM PADDING ELEMENT FOR A PLANE OR VEHICLE SEAT

FIELD OF THE INVENTION

The present invention relates to a method for producing a foam element, especially a foam padding element for a plane or vehicle seat. A layer of material is applied to at least one shaping wall section of a foaming mold. The material layer, during the foaming process, forms a barrier layer between the foam material and the relevant wall section.

BACKGROUND OF THE INVENTION

Methods of forming a foam padding seat element with a barrier layer are already known. The barrier layer prevents direct engagement of the foam material with the shaping wall of the foaming mold to simplify removal from the mold. Also, caking or baking onto the shaping wall is prevented in the area of the barrier layer. However, problems arise with the application of such a layer forming the barrier layer and with its fixation to the shaping wall. Because of the application of the forces working during the foaming process on the shaping wall section, the danger exists of displacement of the layer inserted into and embedded in the mold. Also, the danger exists of formation of folds. Among other things, surface defects or flaws arise on the foam element being produced.

SUMMARY OF THE INVENTION

Objects of the present invention are to provide a method of forming a foam element with a barrier layer which is simple to perform and leads to improved properties in the products obtained by the method. Other objects of the present invention are to provide a foam element produced by this method.

According to the present invention, a fleece with ferromagnetic coating is used as the layer forming the barrier layer. The fleece is held in its position detachably on the mold wall section by means of a cooperating device producing a magnetic field.

The use of a ferromagnetically coated fleece according to the present invention provides a plurality of remarkable advantages. The embedding into the foaming mold is set up to be very simple. The fleece need only be engaged on the wall of the foaming mold, on which it is held in position by the cooperation of the ferromagnetic coating with the magnetic field being generated on the relevant wall section. To produce the magnetic field, permanent magnets are provided, preferably in suitable layer arrangement on the foaming mold. The fleece fits snugly with its ferromagnetic coating without forming folds on the shaping wall. As required, it is fitted to a contoured strip of the relevant wall section. The layer of fleece remains held in place by the magnetic holding forces during the foaming process.

While the ferromagnetic coating of the fleece engaging on the wall section of the foaming mold forms a good foam barrier, in other words a very effective protection layer against the wearing through of foam material on the wall section, the reverse side of the fleece is free of coating and thereby facilitates a good binding with the foam element produced during the foam process. The good binding is by penetration of the foam material into the structure of the fleece. This fleece is thus fastened securely to the relevant surface area of the foam element by means of the foaming attachment. In this relationship, the method of the present invention is suitable in a special manner for the production of foam padding parts for seats, in which mechanical devices are built into or built on the reverse or interior side of the relevant foam padding part. The mechanical devices are, for example, operating devices for seat or backrest adjustment and/or for the adjustment of headrests relative to backrests. The fleece fastened to the relevant surface areas of the foam padding part with its ferromagnetic coating forms a friction-free protection layer to counter wearing through of the foam part by the relevant mechanical parts.

Preferably, a composition is used for the ferromagnetic coating. The composition includes 80 parts polyurethane and 20 parts ferrite powder processed with a binding agent into an easily spreadable mass of material. This material is preferably wiped on by means of a blade or coating nozzle forming a strip on a relevant carrier moved relative to the applicator.

With this arrangement, the fleece to be coated in turn can be used as the carrier. The easily spreadable material is spread directly thereon.

Alternatively, a strip of a silicon-coated carrier (e.g. paper or foil) can be moved relative to the applicator, and thus, can be provided with the coating. In this case, the coated carrier together with a strip of the fleece, while being supported, is guided through a laminating arrangement. The coating of the carrier is applied by lamination on the fleece. Following separation of the strips of the carrier and the fleece carrying the coating, the carrier can be rolled up to be used again for another coating process.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure:

FIG. 3 is a diagrammatically simplified side elevational view of an apparatus or device for producing a coated fleece during performance of the method according to a first embodiment of the present invention; and FIG. 4 is a side elevational view of an apparatus or device for producing a coated fleece according to a second embodiment of the present invention.

DETAILED DESCRIPTION OF THE INVENTION

Figure 1:
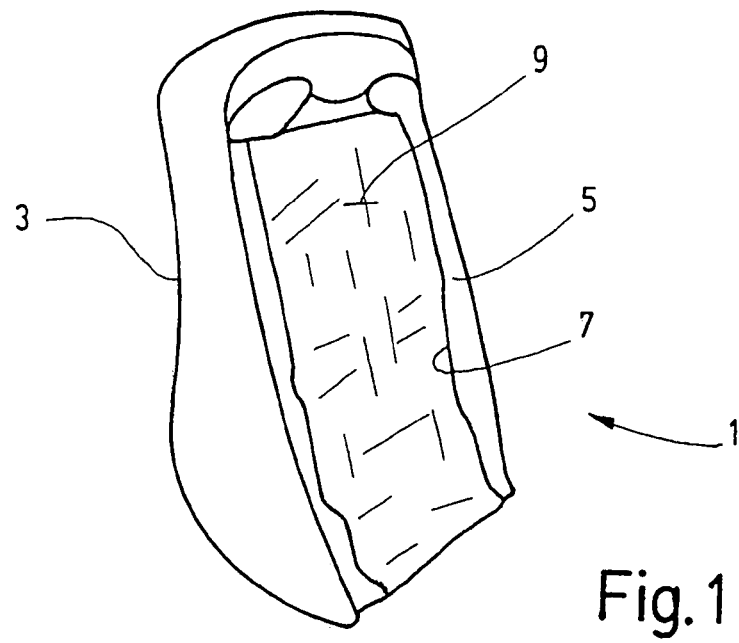
FIG. 1 is a side perspective view of a frontal support part of a vehicle seat back rest according to the present invention.

FIG. 1 shows a foam element 1 in the form of a foam padding element for a vehicle seat. The foam padding element is configured as the front part of a backrest support with its forward side 3 incorporating a shape ergonomically suitable for the support of the back of the rider in the seat. On its reverse side or back 5, the foam element 1 forms a depression in the form of a shallow saucer. The depression is intended to receive the mechanisms associated with the backrest. Such mechanisms include the supporting metal frame as well as the operation and adjustment devices, for example for the height adjustment of the headrest. The support rods of the headrest height adjustment extend upward through the top part of foam element 1. The "mechanisms" are not shown in the drawing.

Figure 2:
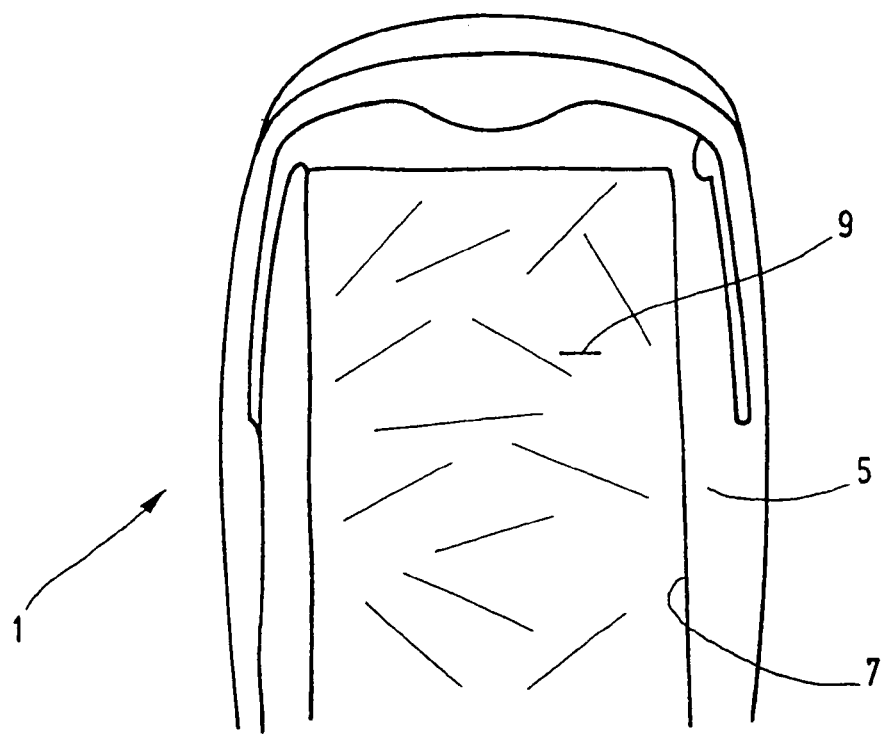
FIG. 2 is an rear elevational view of the foam padding element of FIG. 1.

As is especially clear in FIG. 2, the base of the saucer-like depression on reverse side 5 is covered by a fleece 7. During the foaming process, the fleece is attached by foaming onto the relevant surface of foam element 1. The exposed exterior of fleece 7 has a ferromagnetic coating 9. Ferrite particles are added to coating 9. In the present example, coating 9 is a layer of a polyurethane, and, on the exposed exterior of fleece 7, forms a smooth, thick and friction-free layer. During the foaming process, coating 9 engages on the shaping wall of the foaming mold, where it serves as a foam barrier. The foam material, in cooperation with the free reverse side of fleece 7, can indeed attain a good binding. The foam material is prevented by coating 9 from direct contact with the shaping wall. Thus, any caking or baking of the foam material onto the shaping wall is avoided and the shaping of the foam element is simplified.

Because of the ferromagnetic property of coating 9, the fleece 7 following embedding in the foaming mold can be secured and engaged on the mold shaping wall by means of a suitable magnet arrangement which can provide security. A thrusting, folding, warping or twisting of the fleece by the forces generated during the foaming process is therefore avoided, without the provision of special holding means on the shaping wall of the foaming mold. Strips of permanent magnets can be provided to serve as the magnet arrangement. The magnets can be arranged along the edges of fleece 7 on the exterior of the foaming mold.

Fleece 7, as shown in FIGS. 1 and 2, is foamed on foam element 1 such that coating 9 is turned toward or faces the mechanism mounted in the backrest of the relevant vehicle seat. Coating 9 forms a smooth, low-friction and wear-resistant layer, and therefore, provides protection against wearing through of the surface of foam element 7 by parts of the mechanism as a result of their vibrations or as a result of operational movements of corresponding mechanism parts.

FIGS. 3 and 4 show in detail two different methods for production of fleece 7 with ferromagnetic coating 9. In both cases, the basic fleece material is a non-coated PET-fleece 11 of 20 to 60 g/m$^2$, and preferably approximately 40 g/m$^2$, to which is applied the 60 to 100 g/m$^2$, and preferably approximately 80 g/m$^2$, of ferromagnetic coating 9. This coating is applied as spreadable material by wiping on with an applicator. This material can, for example, be a mixture of 80 parts polyurethane SU 4715 (Firma Stahl) or some similar polyurethane material with the addition of 20 parts ferrite powder of granular size 10 microns. Butamon is used as a diluting medium to process the mixture into an easily spreadable mass of material of approximately 3000 mPa·s.

In the embodiment shown in FIG. 3, the easily spreadable mass forming coating 9 is applied directly on a strip of the non-coated fleece 11. The fleece is unwound from a supply roll. The strip of non-coated fleece 11 is carried through a coating device or station. In the example shown, the coating station has an applicator 13. The strip of fleece 7 with the applied and still wet coating 9 is then carried through a dryer 15. Following drying of coating 9, the coated fleece is rolled up into a roll 17a.

FIG. 4 shows a modified process in which the easily spreadable material forming coating 9 is not applied directly by means of the applicator onto non-coated PET-fleece 11. Rather, a silicon-coated carrier or support 17, for example in the form of a strip of paper or foil, is conveyed from a supply roll 19 to applicator 13. Following application of coating 9 on support 17, the coated support with the strip of non-coated PET-fleece 11 is fed to a calendar arrangement 21. In the calendar arrangement, coating 9 is transmitted from carrier 17 onto fleece 11 by the coating on of a lamina. Subsequently, the strips of carrier 17 and fleece 7 having coating 9 applied thereon pass through the dryer 15. Following passing through dryer 15, carrier 17 is separated from coated fleece 7 and is rolled separately into a roll 23. Coated fleece 7 is rolled into the roll 25. The carrier rolled into roll 23 can be used again, in other words for another manufacturing process for which it can replace the supply roll 19, when this roll is depleted.

While various embodiments have been chosen to illustrate the invention, it will be understood by those skilled in the art that various changes and modifications can be made therein without departing from the scope of the invention as defined in the appended claims.

What is claimed is:

1. A method of producing a foam element, comprising:
placing a flexible fleece with a ferromagnetic coating directly thereon on a wall of a foam mold, said coating extending directly on and embedded in a surface of the fleece facing and engaging the wall of the foam mold;
producing a magnetic field cooperating with the ferromagnetic coating on the fleece to hold detachably the fleece in position on the wall of the foam mold, said fleece covering a substantial portion of the wall of the foam mold;
molding the foam element in the foam mold with the fleece on the wall thereof to embed the fleece in the molded foam element; and
removing the molded foam element from the foam mold with the fleece embedded into a surface of the molded foam element to form a barrier layer on the foam element.

2. A method according to claim 1 wherein the fleece is a polyester of 20 to 60 g/m$^2$.

3. A method according to claim 2 wherein said fleece is a PET fleece; and the ferromagnetic coating is applied to said fleece at 60 to 100 g/m$^2$.

4. A method according to claim 3 wherein the ferromagnetic coating has a composition including 80 parts polyurethane and 20 parts ferrite powder, and is processed with a solvent into an easily spreadable material.

5. A method according to claim 2 wherein the ferromagnetic coating has a composition including 80 parts polyurethane and 20 parts ferrite powder, and is processed with a solvent into an easily spreadable material.

6. A method according to claim 5 wherein the ferrite powder comprises iron particles of 10 microns; and the solvent is 1-butamone.

7. A method according to claim 1 wherein the ferromagnetic coating is applied by a blade as an easily spreadable material.

8. A method according to claim 1 wherein the ferromagnetic coating is applied by a nozzle as an easily spreadable material.

9. A method according to claim 1 wherein the ferromagnetic coating is applied as an easily spreadable material to the fleece on a carrier strip moved relative to an applicator.

10. A method according to claim 1 wherein the fleece is conveyed through a dryer after application of the ferromagnetic coating.

11. A method according to claim 1 wherein
the ferromagnetic coating is applied by an applicator as an easily spreadable material as a layer on a strip of a silicon-coated carrier moved relative to the applicator; and
the strip of the carrier with the layer and a strip of the fleece are conveyed through a laminator to laminate the layer on the carrier onto the fleece.

12. A method according to claim 11 wherein the fleece is conveyed through a dryer after the laminator.

13. A method according to claim 12 wherein the carrier and the fleece are separated from one another following passage through the dryer.

14. A foam element, comprising
a body of molded foam material; and
a barrier layer on one surface of said body, said barrier layer being a flexible fleece with a ferromagnetic coating directly thereon, said fleece being embedded into said surface of said body and covering a substantial portion of said surface of said body of molded foam material, said coating extending across at a portion of a surface of said fleece and embedded in said fleece.

15. A foam element according to claim 14 wherein a surface of said barrier layer embedded into said surface of body is free of said ferromagnetic coating.

16. A method according to claim 1 wherein
an inner surface of said fleece, opposite the surface with the ferromagnetic coating, is free of the ferromagnetic coating; and
said inner surface faces away from the wall of the foam mold when the fleece is placed on that wall for embedding in the foam element.

17. A method of producing a foam element, comprising:
placing a flexible fleece with a flexible ferromagnetic coating directly thereon on a wall of a foam mold and conforming the fleece to a contour of the mold wall, said fleece covering a substantial portion of said mold wall, said coating embedded in and directly engaging the fleece extending across at least a portion of a surface of the fleece facing and directly engaging the wall of the foam mold;
producing a magnetic field cooperating with the ferromagnetic coating on the fleece to hold detachably the flexible fleece in position on and to shape and conform to the contour of the mold wall during molding;
molding the foam element in the foam mold with the fleece on the wall thereof to bind the fleece to the foam element; and
removing the molded foam element from the foam mold with the fleece embedded into a surface of the foam element as a barrier layer on the foam element.

18. The method of claim 17 wherein
said mold includes permanent magnets to secure the flexible fleece in place during molding.

19. The method of claim 18 wherein
said permanent magnets are positioned on an exterior surface of the mold; and
the said permanent magnets are arranged to coincide with the edges of the flexible fleece.

20. The method of claim 18 wherein
the permanent magnets secure the fleece to the contour of the mold during molding to prevent the fleece from folding, warping or twisting.

21. The method of claim 17 wherein
the flexible coating forms a wear resistant layer on said fleece.

22. The method of claim 17 wherein
said coating extends entirely across said surface of said fleece.

23. The method of claim 1 wherein
said coating extends entirely across said surface of said fleece.

* * * * *